(12) United States Patent
Cho et al.

(10) Patent No.: US 9,170,355 B2
(45) Date of Patent: Oct. 27, 2015

(54) REFLECTIVE POLARIZER HAVING A DISPERSED POLYMER

(75) Inventors: Duk Jae Cho, Anyang-si (KR); Jung Wan Han, Seoul (KR); Myeong Ki Baek, Yongin-si (KR); Hwang Kyu Lee, Anseong-si (KR); Seung Jin Ko, Anseong-si (KR)

(73) Assignee: WOONGJIN CHEMICAL CO., LTD. (KR)

( * ) Notice: Subject to any disclaimer, the term of this patent is extended or adjusted under 35 U.S.C. 154(b) by 256 days.

(21) Appl. No.: 13/984,580

(22) PCT Filed: Feb. 7, 2012

(86) PCT No.: PCT/KR2012/000895
§ 371 (c)(1),
(2), (4) Date: Oct. 18, 2013

(87) PCT Pub. No.: WO2012/108673
PCT Pub. Date: Aug. 16, 2012

(65) Prior Publication Data
US 2014/0043786 A1    Feb. 13, 2014

(30) Foreign Application Priority Data
Feb. 9, 2011    (KR) .................... 10-2011-0011582

(51) Int. Cl.
G02B 5/30        (2006.01)
G02F 1/1335      (2006.01)

(52) U.S. Cl.
CPC ............. *G02B 5/30* (2013.01); *G02B 5/3025* (2013.01); *G02F 1/133536* (2013.01); *G02F 2202/022* (2013.01); *G02F 2202/30* (2013.01); *G02F 2202/40* (2013.01)

(58) Field of Classification Search
CPC ........................................... G02B 5/30
See application file for complete search history.

(56) References Cited

FOREIGN PATENT DOCUMENTS

| JP | 2007025089 A | 2/2007 |
| JP | 2008518268 A | 5/2008 |
| KR | 1020070114776 A | 12/2007 |
| WO | WO 2006093660 A1 * | 9/2006 |

OTHER PUBLICATIONS

International Search Report filed in connection with PCT/KR2012/000895.

* cited by examiner

*Primary Examiner* — Mary Ellen Bowman
(74) *Attorney, Agent, or Firm* — Levenfeld Pearlstein, LLC

(57) ABSTRACT

A reflective polarizer of the invention has excellent optical properties even though a very small number of polymer components per unit area is disposed inside a matrix thereof compared to reflective polarizers of the related art, which include birefringent polymer, since the polymer inside the matrix has a plate-like shape. This is advantageous for covering the entire range of visible light, since a plate-like polymer having a variety of optical thicknesses can be used. The additional processing of bonding the skin layer is not performed, since the skin layer is formed on at least one surface of the core layer in the state in which it is molten. This can greatly reduce manufacturing costs, and is advantageous in that it maximizes optical properties in a limited thickness.

18 Claims, 16 Drawing Sheets

REFLECTIVE POLARIZER HAVING A DISPERSED POLYMER

CROSS-REFERENCE TO RELATED APPLICATIONS

This is a National Stage Application of International Patent Application No. PCT/KR2012/000895, filed Feb. 7, 2012, which claims the benefit of and priority to Korean Patent Application No. 10-2011-0011582, filed Feb. 9, 2011, the contents of which are incorporated fully by reference herein.

BACKGROUND OF THE INVENTION

1. Field of the Invention

The present invention relates to a polymer-dispersed reflective polarizer, and more particularly, to a polymer-dispersed reflective polarizer in which a light modulation effect can be maximized using a smaller number of polymer components disposed inside a matrix.

2. Description of Related Art

Flat display technologies cover, as main items, liquid crystal displays (LCDs), projection displays and plasma display panels (PDPs), which already occupy a significant share of the market. Field emission displays (FEDs) and electroluminescent displays (ELDs) are also expected to occupy their own market share, based on their characteristics in response to the advancement of related technologies. LCDs are expanding their application range over notebook computers, personal computer (PC) monitors, liquid crystal TVs, automobiles, aircraft, and the like, and occupy about 80% of the flat display market. The LCD industry has enjoyed prosperous times to date because of the rapid increase in the worldwide demand for LCDs.

In LCDs in the related art, a liquid crystal and an electrode matrix are disposed between a pair of light-absorbing optical films. In LCDs, liquid crystals change their orientation in response to an electric field that is generated by applying a voltage to two electrodes, thereby changing the optical properties thereof. This processing displays an image in "pixel" units, which contain information, using polarization in a specific orientation. Because of this, LCDs include a front optical film and a rear optical film, which induce polarization.

Optical films used in such LCDs cannot be said to use light projected from a backlight with high efficiency. This is because at least 50% of the light projected from the backlight is absorbed by a rear-side optical film (an absorbing polarizer film). Therefore, in LCDs, a reflective polarizer is disposed between an optical cavity and a liquid crystal assembly in order to increase the efficiency with which backlight light is used.

FIG. 1 is a view showing an optical principle of a reflective polarizer of the related art. Specifically, P polarization of light that is directed from the optical cavity to the liquid crystal assembly is allowed to pass through the reflective polarizer so that it is forwarded to the liquid crystal assembly. S polarization of light that is reflected from the reflective polarizer to the optical cavity is reflected from a diffusion-reflecting surface of the optical cavity in the state in which the direction of the polarization is randomized, and is then forwarded to the reflective polarizer again. Finally, the S polarization is converted into the P polarization, which can pass through the polarizer of the liquid crystal assembly. Consequently, the converted P polarization passes through the reflective polarizer, so that it is forwarded to the liquid crystal assembly.

This processing of the reflective polarizer on incident light, in which the S polarization is selectively reflected and the P polarization is allowed to pass through, is established due to the setting of the optical thickness of each optical layer and variation in the refractive index of each optical layer, which are caused by the difference in refractive indexes between the optical layers and the stretching of the stacked optical layers in the state in which flat optical layers having an anisotropic refractive index and flat optical layers having an isotropic refractive index are stacked such that they alternate with each other.

That is, light incident on the reflective polarizer is repeatedly reflected as S polarization and is allowed to pass through as P polarization while passing through respective optical layers, so that only the P polarization of the incident light is finally forwarded to the liquid crystal assembly. On the other hand, as described above, the reflected S polarization is reflected from the diffusion-reflecting surface of the optical cavity in the state in which the polarized state is randomized, and is then forwarded to the reflective polarizer. This makes it possible to reduce the loss of light that is generated from a light source and the consequent waste of electrical power.

However, the reflective polarizer of the related art has a problem in that its manufacturing process is complicated, since the reflective polarizer is manufactured by stacking the flat isotropic optical layers and the flat anisotropic optical layers, which have different refractive indexes, such that they alternate with each other, and by stretching the stack of the layers such that the optical thickness and refractive index of each optical layer are optimized to selectively reflect and transmit incident polarization. In particular, since each optical layer of the reflective polarizer has a flat panel structure, P polarization and S polarization must be divided in response to the wide range of the angle of incidence of incident polarization. Therefore, the number of optical layers that are stacked is increased excessively, thereby exponentially increasing the production cost. In addition, the structure in which the number of the stacked optical layers is excessive causes a problem in that light loss may degrade the optical performance thereof. In addition, in the related art, when a skin layer made of polycarbonate and a core layer, which is a stack of alternating PEN/co-PEN layers, are integrated together via co-extrusion, peeling may occur due to the absence of compatibility. Because the degree of crystallinity is about 15%, the danger of birefringence with respect to the stretching axis is high when stretching is performed. Therefore, a bonding layer must be formed between the core layer and the skin layer in order to apply a polycarbonate sheet without stretching. As a result, the addition of the bonding layer results in a decrease in yield due to the presence of foreign impurities and the incidence of process defects. Typically, when an unstretched polycarbonate sheet of the skin layer is produced, birefringence occurs due to the irregular shearing pressure caused by the winding process. In order to correct this, additional processing, such as modification of the molecular structure of polymer and control over the speed of an extrusion line, is required, thereby lowering productivity.

Accordingly, disclosed is a technical concept that can realize the function of a reflective polarizer by arranging a birefringent polymer, which is stretched in the lengthwise direction, inside a matrix. FIG. 2 is a perspective view of a reflective polarizer 20 that contains a rod-like polymer. Inside a matrix 21, a birefringent polymer 22, which is stretched in the lengthwise direction, is arranged in one direction. Then, a light modulation effect is induced by the birefringent interface between the matrix 21 and the birefringent polymer 22, so that the function of a reflective polarizer can be performed. However, there is a problem in that the light modulation efficiency is too low compared to the foregoing reflective polarizer, which comprises a stack of alternating layers. In order to have transmittance and reflectivity similar to those of the reflective polarizer having the stack of alternating layers, an excessive number of rods of birefringent polymer 22 must be arranged inside the matrix, which is problematic. Specifically, when manufacturing a display panel having a width of 32 inches with respect to the vertical cross-section of the reflective polarizer, at least one hundred million spherical or oval particles of the birefringent polymer 22, the cross-sectional diameter of which ranges from 0.1 μm to 0.3 μm in the lengthwise direction, must be contained inside the matrix 21, which has a width of 1580 mm and a height (thickness) of 400 μm or less, in order to achieve optical properties similar to those of the stack-type reflective polarizer. In this case, the production cost is excessively increased, facilities are excessively complicated, and it is almost impossible to manufacture a spinneret, which produces the polymer. Therefore, it is difficult to commercially distribute this reflective polarizer.

In order to overcome such problems, a technical concept in which birefringent sea-island fibers are contained inside a matrix was proposed. FIG. 3 is a cross-sectional view of a birefringent sea-island fiber contained inside the matrix. The birefringent sea-island fibers may create a light modulation effect at the light modulation interface between the inside island part and the sea part. Unlike the foregoing birefringent polymer, desirable optical properties can be realized even if a large number of sea-island fibers are not arranged. However, since the birefringent sea-island fibers are fiber, some problems, such as compatibility with the polymer matrix, ease of handling, and adherence, occur. Furthermore, the circular configuration induces the scattering of light, so that the efficiency of reflective polarization of light wavelengths in the visible light range is reduced. Polarization characteristics are degraded compared to existing products, and thus the improvement in illumination is limited. In addition, sea-island fibers suffer from degradation in light characteristics due to light leak or light loss, since the junction between the islands is reduced but the sea area is subdivided, thereby forming gaps. Furthermore, the texture-like tissue structure limits the construction of layers, so that the improvement in the reflection and polarization characteristics is limited.

The information disclosed in this Background of the Invention section is only for the enhancement of understanding of the background of the invention, and should not be taken as an acknowledgment or any form of suggestion that this information forms a prior art that would already be known to a person skilled in the art.

BRIEF SUMMARY OF THE INVENTION

Various aspects of the present invention provide a reflective polarizer, which has excellent optical properties even though a very small number of polymer components is disposed inside a matrix thereof compared to reflective polarizers that include birefringent polymer components of the related art.

Also provided is a reflective polarizer, which can be integrally formed without an additional bonding layer between a core layer and a skin layer.

In an aspect of the present invention, provided is a reflective polarizer including a plurality of disperse phases, the plurality of disperse phases being dispersed in a matrix in order to allow first polarization, which is emitted from the outside, to pass through while reflecting second polarization. The refractive index of the plurality of disperse phases is different in at least one axial direction from that of the matrix. A light modulation interface is formed between the plurality of disperse phases and the matrix. The aspect ratio, which is the ratio of the length of the long axis to the length of the short axis with respect to the vertical cross-section of a polarizer, does not exceed 1/1000.

In an exemplary embodiment of the invention, the first polarization may be a longitudinal wave, and the second polarization may be a transverse wave.

In an exemplary embodiment of the invention, the matrix may be stretched in at least one axial direction.

In an exemplary embodiment of the invention, a skin layer may be integrally formed on at least one surface of the matrix, and a bonding layer may not be formed between the matrix and the skin layer.

In an exemplary embodiment of the invention, the matrix may be at least one selected from among, but not limited to, polyethylene naphthalate (PEN), co-polyethylene naphthalate (co-PEN), polyethylene terephthalate (PET), polycarbonate (PC), polycarbonate (PC) alloy, polystyrene (PS), heat-resistant polystyrene (PS), polymethylmethacrylate (PMMA), polybutylene terephthalate (PBT), polypropylene (PP), polyethylene (PE), acrylonitrile butadiene styrene (ABS), polyurethane (PU), polyimide (PI), polyvinylchloride (PVC), styrene acrylonitrile (SAN) mixture, ethylene vinyl acetate (EVA), polyamide (PA), polyacetal (polyoxymethylene: POM), phenol, epoxy (EP), urea (UF), melanin (MF), unsaturated polyester (UP), silicon (Si), elastomer and cyclo olefin polymer (COP).

In another exemplary embodiment of the invention, the disperse phases is preferred to polymer component. The polymer component may be at least one selected from among, but not limited to, polyethylene naphthalate (PEN), co-polyethylene naphthalate (co-PEN), polyethylene terephthalate (PET), polycarbonate (PC), polycarbonate (PC) alloy, polystyrene (PS), heat-resistant polystyrene (PS), polymethylmethacrylate (PMMA), polybutylene terephthalate (PBT), polypropylene (PP), polyethylene (PE), acrylonitrile butadiene styrene (ABS), polyurethane (PU), polyimide (PI), polyvinylchloride (PVC), styrene acrylonitrile (SAN) mixture, ethylene vinyl acetate (EVA), polyamide (PA), polyacetal (polyoxymethylene: POM), phenol, epoxy (EP), urea (UF), melanin (MF), unsaturated polyester (UP), silicon (Si), elastomer and cyclo olefin polymer (COP).

In an exemplary embodiment of the invention, the difference in the refractive indexes between the matrix and the plurality of disperse phases in the direction of the stretched axis may be greater than that in the direction of the other axis.

In another exemplary embodiment of the invention, the difference in the refractive indexes between the matrix and the plurality of disperse phases may be 0.05 or less in two axial directions and 0.1 or more in the other one axial direction.

In an exemplary embodiment of the invention, the matrix may be stretched in at least one axial direction.

In another exemplary embodiment of the invention, the matrix may be stretched in the lengthwise direction of the polymer.

In an exemplary embodiment of the invention, the optical thickness of the disperse phases may range from 1/3 to 1/5 of an intended optical wavelength λ.

In another exemplary embodiment of the invention, the plurality of disperse phases may form a plurality of layers, which are separated from each other with respect to the lengthwise vertical cross-section of the disperse phases.

In a further exemplary embodiment of the invention, the number of the separated layers may be 50 or more, preferably 100 or more, more preferably 150 or more, still more preferably 200 or more, even more preferably 400 or more, and most preferably 600 or more.

In another exemplary embodiment of the invention, the disperse phases that form an N+1st layer and the disperse phases that for an Nth layer may be arrayed in a zigzag pattern.

In a further exemplary embodiment of the invention, the number of disperse phases that form one layer may range from 30 to 1000, and the gap between the layers may range from 0.001 μm to 1.0 μm.

In another exemplary embodiment of the invention, the aspect ratio may be 1/3000 or less, 1/5000 or less, 1/10000 or less, 1/20000 or less, 1/30000 or less, 1/50000 or less, or 1/700000 or less.

In a further exemplary embodiment of the invention, the length of the short axis of the vertical cross-section of the disperse phases may range from 0.01 μm to 1.0 μm.

In another exemplary embodiment of the invention, the fraction of the plurality of disperse phases that satisfy the foregoing aspect ratio is 50% or more, 60% or more, 70% or more, or 80% or more.

In an exemplary embodiment of the invention, the number of the plurality of disperse phases in the matrix having a width of 1580 mm and a height of 400 μm with respect to the vertical cross-section of the reflective polarizer may be one million or less, more preferably 500 thousand or less, and most preferably 300 thousand or less. In this case, the transmittance of the reflective polarizer in the direction of the transmission axis may be 80% or more, and the transmittance of the reflective polarizer in the direction of the reflection axis is 12% or less. More preferably, the transmittance of the reflective polarizer in the direction of the transmission axis is 83% or more, and the transmittance of the reflective polarizer in the direction of the reflection axis is 10% or less. Most preferably, the transmittance of the reflective polarizer in the direction of the transmission axis is 85% or more, and the transmittance of the reflective polarizer in the direction of the reflection axis is 7% or less.

In another exemplary embodiment of the invention, the average distance $d_1$ between adjacent disperse phases that form the same layer may be smaller than the average distance $d_2$ between adjacent disperse phases that form different layers.

In another aspect of the invention, also provided is a liquid crystal display (LCD) that includes the foregoing reflective polarizer of the invention. The LCD may also include a reflecting means for reflecting light that is modulated by the reflective polarizer again to the reflective polarizer.

A brief description will be given below of terminologies used herein.

The notation "polymer is birefringent" indicates that a fiber of the polymer has different refractive indexes depending on the direction, such that it refracts a beam of light that is incident thereon into two or more rays of light in different directions.

The term "isotropy" indicates that the refractive index of an object is identical in all directions when light passes through the object.

The term "anisotropy" indicates that an object has optical properties that differ depending on the direction of light, and is an antonym of isotropy. An anisotropic object is birefringent.

The term "light modulation" indicates that emitted light is reflected, refracted, or scattered, or that the intensity, the period of a wave, or the properties of the light are changed.

The term "aspect ratio" indicates the ratio of the length of the long axis to the length of the short axis with respect to the vertical cross-section in the lengthwise direction of a stretched body.

According to embodiments of the invention, t reflective polarizer of the invention has excellent optical properties even though a very small number of polymer components per unit area is disposed inside a matrix thereof compared to reflective polarizers of the related art, which include birefringent polymer, since the polymer inside the matrix has a plate-like shape. This is advantageous for covering the entire range of visible light, since a plate-like polymer having a variety of optical thicknesses can be used.

In addition, the additional processing of bonding the skin layer is not performed, since the skin layer is formed on at least one surface of the core layer in the state in which it is molten. This can greatly reduce manufacturing costs, and is advantageous in that it maximizes optical properties in a limited thickness.

The methods and apparatuses of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Reference will now be made in detail to various embodiments of the present invention, examples of which are illustrated in the accompanying drawings and described below.

As described above, reflective polarizers that contain birefringent polymer in the matrix thereof of the related art have a problem in that their optical properties are significantly inferior to those of laminated reflective polarizers and thus an excessive amount of birefringent polymer must be disposed in the matrix in order to improve the optical properties. Furthermore, the core layer and the skin layer are separately prepared and are joined together using the bonding layer, thereby increasing costs. This also leads to a decrease in the thickness of the core layer, thereby lowering the optical properties and significantly increasing the defective fraction.

Accordingly, the invention has sought to overcome the foregoing problems by devising a reflective polarizer including a plurality of disperse phases (preferably polymer components), the plurality of polymer components being dispersed in a matrix in order to allow first polarization, which is emitted from outside, to pass through while reflecting second polarization. The refractive index of the plurality of polymer components is different in at least one axial direction from that of the matrix. A light modulation interface is formed between the plurality of polymer components and the matrix. The aspect ratio, which is the ratio of the length of the long axis to the length of the short axis with respect to the vertical cross-section of a polarizer, does not exceed 1/1000.

Figure 1:
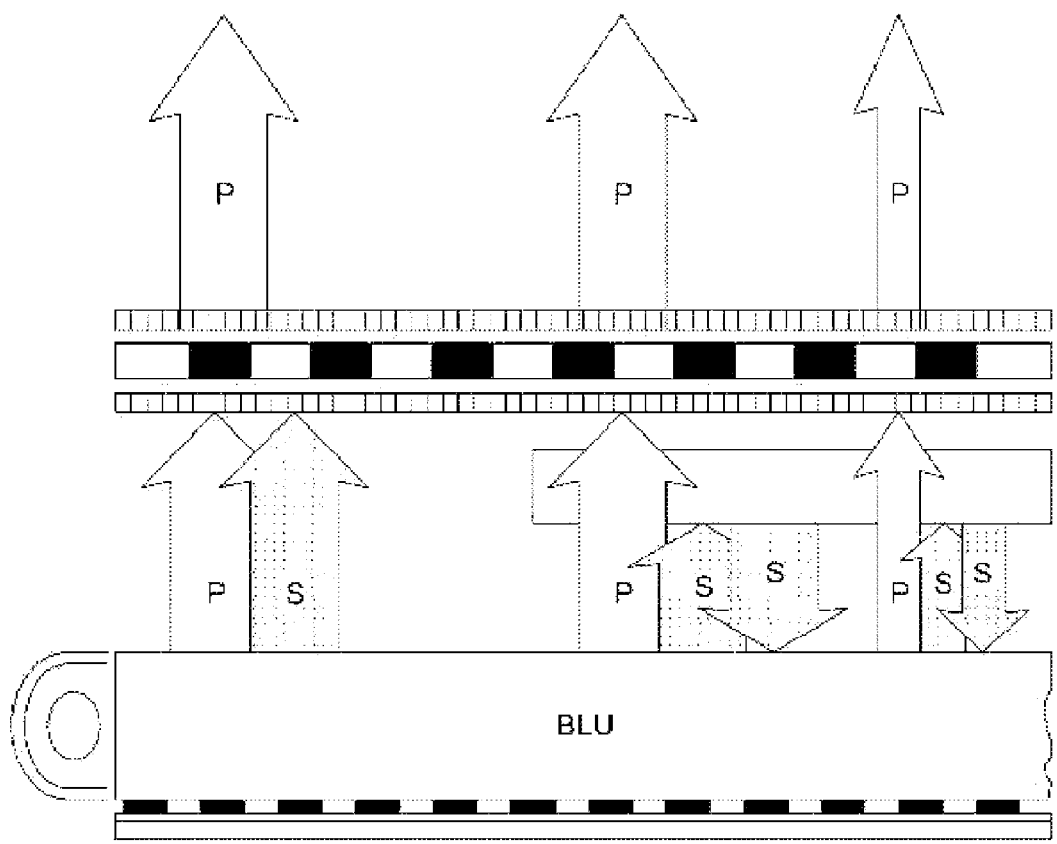
FIG. 1 is a view showing an optical principle of a reflective polarizer of the related art.
Figure 2:
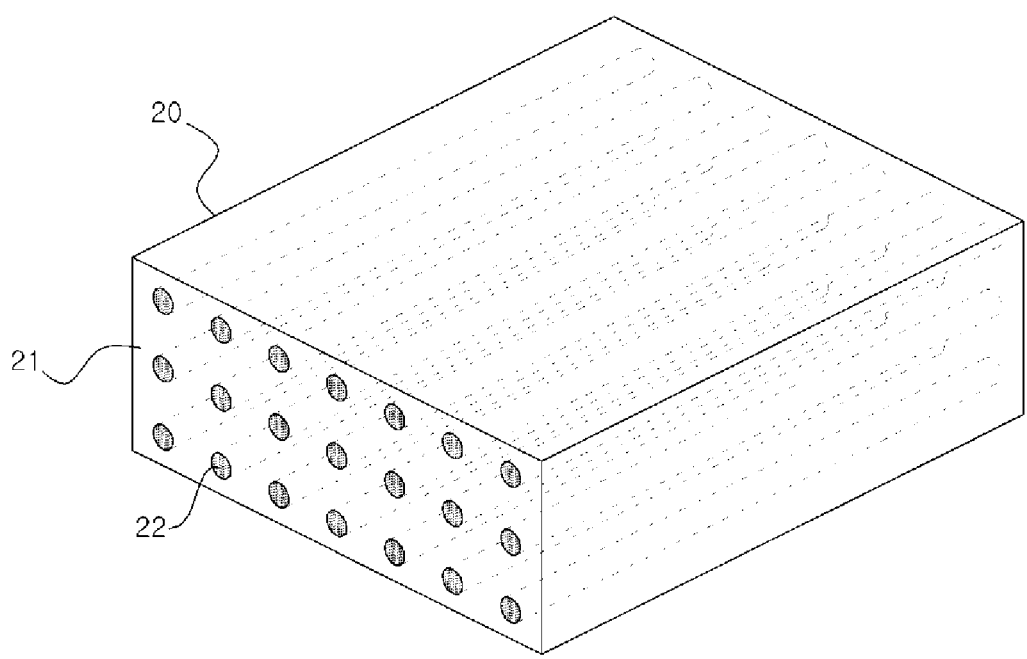
FIG. 2 is a perspective view of a reflective polarizer that contains a rod-like polymer.
Figure 3:
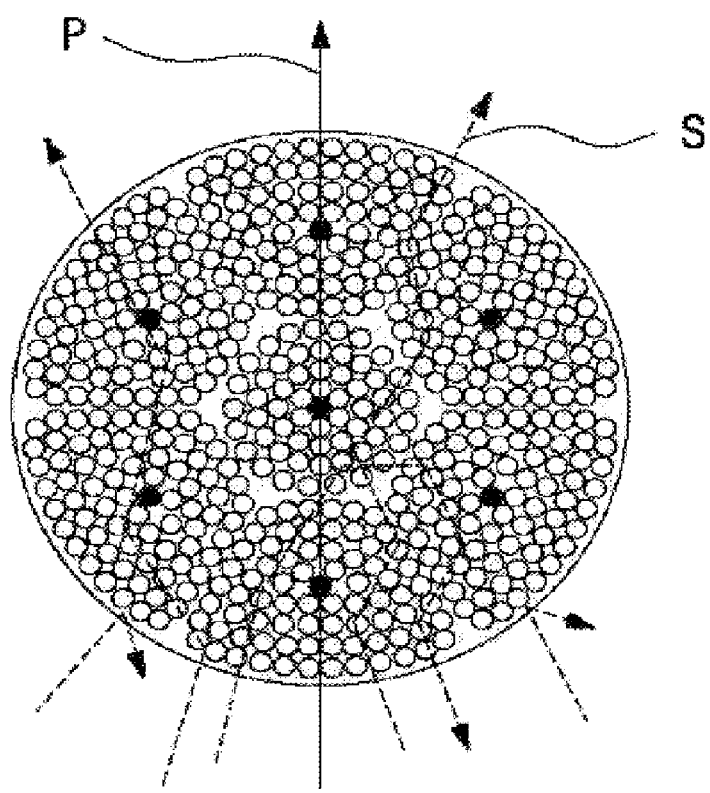
FIG. 3 is a cross-sectional view showing the paths of light that is incident on birefringent sea-island fibers contained inside the matrix.
Figure 4:
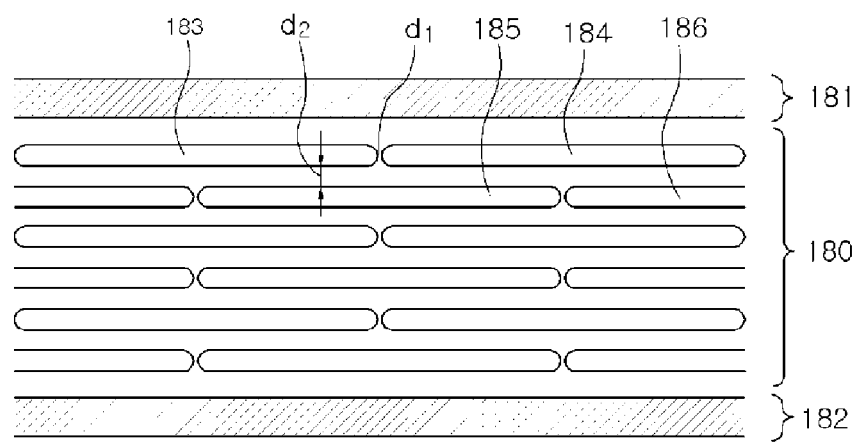
FIG. 4 is a cross-sectional view showing a reflective polarizer according to an exemplary embodiment of the invention.

FIG. 4 is a cross-sectional view showing a reflective polarizer according to an exemplary embodiment of the invention. As shown in FIG. 4, skin layers 181 and 182 are formed on both surfaces of a core layer 180, and a plurality of polymer components 183, 184, 185 and 186 is dispersed in the core layer 180. The plurality of dispersed polymer components 183, 184, 185 and 186 may be of a sheet type in which the aspect ratio, i.e. the ratio of the length of the long axis to the length the short axis with respect to a vertical cross-section of a polarizer, does not exceed 1/1000. The polymer may have a suitable optical thickness in order to reflect an intended wavelength range of light (S wave), and may have a variation in the thickness thereof within a suitable range.

Here, the optical thickness is n (refractive index)×d (physical thickness). Here, the wavelength and the optical thickness of light are defined according to the following relation 1:

$$\lambda = 4nd \qquad \text{Relation 1,}$$

where $\lambda$ is the wavelength (nm) of light, n is a refractive index, and d is a physical thickness (nm).

Therefore, when the average optical thickness of the polymer components is 150 nm, a transverse wave (S wave) having a wavelength of 400 nm can be reflected according to Relation 1. In this case, when the variation in the thickness is 30%, a wavelength ranging approximately from 420 nm to 780 nm can be covered. In addition, when the plate-like polymer, the plurality of first components, is optically birefringent, it is required to allow the P wave to pass through but reflect the S wave. Therefore, it is possible to calculate an average optical thickness by setting the refractive index n (z-axial refractive index) with respect to the thickness direction in which light passes. Therefore, the optical thickness of the polymer components may range from 1/3 to 1/5 of the intended optical wavelength $\lambda$.

In addition, the plate-like polymer components dispersed in the core layer form a plurality of layers while being spaced apart from each other. In this case, the number of layers formed by the plate-like polymer components in one group may be 100 or more, preferably 150 or more, still more preferably 200 or more, even more preferably 400 or more, and most preferably 600 or more. In order to maximize the light modulation effect, as in FIG. 15, the polymer components of adjacent layers may be arrayed in a zigzag pattern.

The average distance $d_1$ between adjacent polymer components that form the same layer may be smaller than the average distance $d_2$ between adjacent polymer components that form different layers, in order to improve the light modulation effect. This can consequently minimize the distance between polymer components that form the same layer, so that the leakage of light is reduced, thereby maximizing the light modulation effect.

According to an exemplary embodiment of the invention, the invention is implemented as only a core layer, or as an integral structure comprising a core layer and a skin layer. As a result, it is possible to significantly improve the optical properties by preventing the optical properties from being degraded by a bonding layer and adding more layers to a specific thickness. Furthermore, the skin layer of the invention is subjected to stretching after being manufactured simultaneously with the core layer, and thus can be stretched in at least one axial direction, unlike the related art, in which the core layer is bonded to the skin layer, which is not stretched, after being stretched. This processing increases the surface hardness of the skin layer of the invention more than that of the unstretched skin layer, thereby improving scratch resistance and heat resistance.

Figure 5:
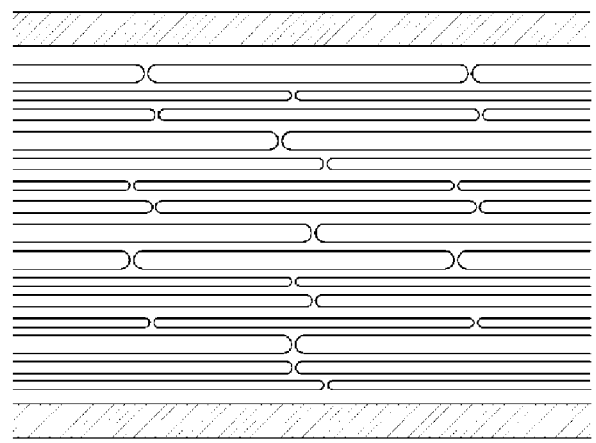
FIG. 5 is a cross-sectional view showing a reflective polarizer according to another exemplary embodiment of the invention.

FIG. 5 is a cross-sectional view showing a reflective polarizer according to another exemplary embodiment of the invention. Describing the difference from FIG. 4, polymer components having different average optical thicknesses are arranged randomly or as groups inside the core layer. This makes it possible to cover a variety of light wavelength ranges, so that the S wave in the entire visible light range can be reflected. This structure can be realized by a method of variously adjusting the diameter or cross-section of an island component passage, through which the island component is supplied, inside the sea-island type extrusion mouthpiece.

Figure 6:
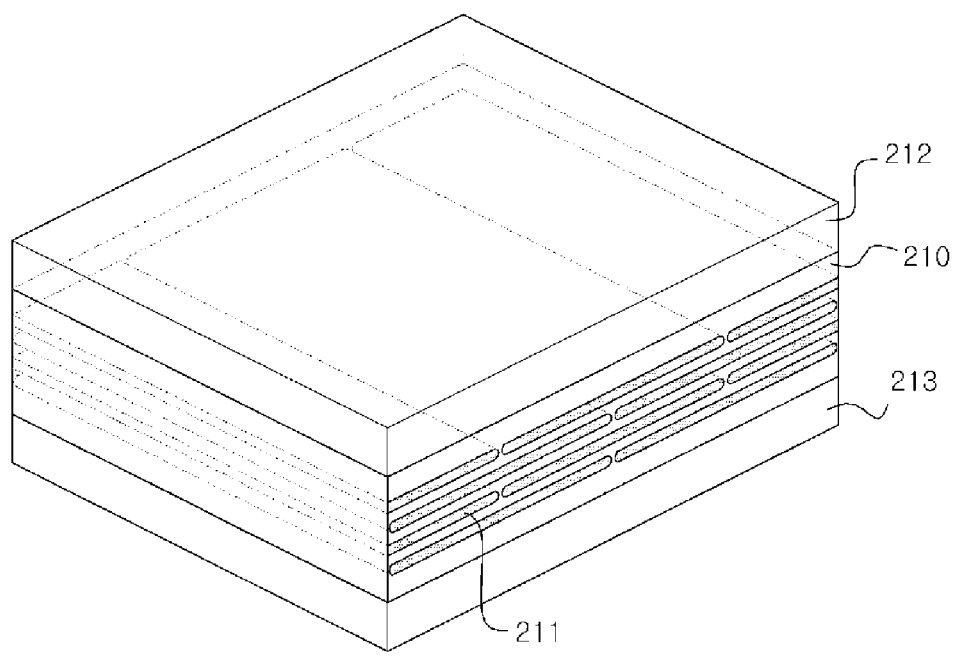
FIG. 6 is a perspective view showing a reflective polarizer according to an exemplary embodiment of the invention.

FIG. 6 is a perspective view showing a reflective polarizer according to an exemplary embodiment of the invention. In this polarizer, a plurality of polymer components 211 stretched in the lengthwise direction inside a second polymer component 210, in which the shape of the cross-section is plate-like. Skin layers 212 and 213 are formed on both surfaces of the second polymer component 210. In this case, although the plate-like polymer components 211 may be stretched in a variety of directions, it is preferable that they be stretched in one direction. More preferably, it is effective for them to be stretched such that they are parallel to each other and such that the axis of stretching is perpendicular to the direction of light that is incident from an external light source, in order to maximize the light modulation effect.

Figure 7:
FIG. 7 is a cross-sectional view showing a plate-like polymer element according to an exemplary embodiment of the invention.

According to an embodiment of the invention, the aspect ratio, which is the ratio of the length of the long axis to the length the short axis with respect to a vertical cross-section of a polarizer, does not exceed 1/1000. FIG. 7 is a lengthwise cross-sectional view showing a sheet-like polymer component that is applicable to the invention. When the length of the long axis is "a" and the length of the short axis is "b," the ratio of the length "a" of the long axis to the length "b" of the short axis must be 1/1000 or less. In other words, when the length "a" of the long axis is 1000, the length "b" of the short axis must be 1 or less, which is 1/1000 of the length "a." When the ratio of the length "a" of the long axis to the length "b" of the short axis is greater than 1/1000, there is a problem in that it is difficult to realize intended optical properties. The aspect ratio can be suitably adjusted by inducing the spreading and the stretching of the plurality of first components in the foregoing manufacturing step. Although the cross-section of the polymer is shown throughout the figures of the invention as if the ratio of the length of the long axis to the length of the short axis is greater than 1/1000, it is only because the figures are expressed in the way such that they will help in promoting understanding. In fact, the length in the long axial direction is longer than in the shown polymer, and the length in the short axial direction is shorter than in the shown polymer.

More specifically, in the case of a 32-inch display having a width of 1580 mm and a height of 400 μm, the reflective polarizer of the related art requires at least one hundred million particles of birefringent polymer in a vertical cross-section of the reflective polarizer in order to exhibit the desired optical properties. In contrast, the reflective polarizer of the invention can achieve optical properties in which the transmittance in the direction of the transmission axis of the polarizer is 90% or more and the transmittance in the direction of the reflection axis of the polarizer is 30% or less when the number of plate-like polymer components that are contained therein is one million or less. More preferably, it is possible to achieve optical properties that include transmittance in the transmission axis of 87% or more and transmittance in the reflection axis of 10% or less. Most preferably, the transmittance in the transmission axis may be 85% or more and the transmittance in the reflection axis may be 7% or less. In this case, the number of plate-like polymer components that are contained in the reflective polarizer of the invention may be preferably 500 thousand or less, and most preferably 300 thousand or less. For this, according to an exemplary embodiment of the invention, the ratio of the length of the long axis to the length of the short axis may be preferably 1/1000 or less, more preferably 1/1500 or less, more preferably 1/2000 or less, more preferably, 1/3000 or less, more preferably 1/5000 or less, more preferably 1/10000 or less or 1/20000 or less, still more preferably 1/30000 or less, even more preferably 1/50000 or less, most preferably from 1/70000 to 1/200000.

As a result, it is possible to achieve intended optical properties using a smaller number of plate-like polymer components contained inside the matrix with the decreasing ratio of the length of the long axis to the length of the short axis.

When the aspect ratio of the plate-like polymer components is very small, the space between the plate-like polymer components that form the same layer may become very small. However, in the reflective polarizer of the invention, at least one space must be present between the plate-like polymer components that form the same layer.

According to an exemplary embodiment of the invention, in the reflective polarizer, the plate-like polymer components that satisfy the foregoing aspect ratio condition may be 50% or more, preferably 60% or more, more preferably 70% or more, even more preferably 80% or more, and most preferably 90% or more of total plate-like polymer components that are contained inside the matrix, in order to achieve the foregoing optical properties.

According to an exemplary embodiment of the invention, the birefringent interface may be formed between the plate-like polymer (first components) and the matrix (second material), which form the core layer. Specifically, in the reflective polarizer that contains the polymer inside the matrix, the extent of substantial sameness or difference between the refractive indexes along the X, Y or Z axis in the space between the matrix and the plate-like polymer has an effect on the degree of scattering of polarized light depending on the axis. In general, the scattering power varies in relation to the square of the difference of the refractive indexes. Therefore, as the degree of the difference of the refractive index along a specific axis increases, light that is polarized along that axis scatters more strongly. In contrast, when the difference along a specific axis is small, the degree of scattering of light that is polarized along that axis becomes small. When the refractive index of the matrix is substantially the same as that of the plate-like polymer along one axis, incident light that is polarized by an electric field parallel to that axis will pass through the polymer without scattered irrespective of the size, shape or density of a portion of the polymer. In addition, when the refractive index along that axis is substantially the same, light passes through that object without being substantially being scattered. More specifically, first polarization (P wave) passes through without being influenced by the birefringent interface that is formed between the matrix and the polymer, but second polarization (S wave) is influenced by the birefringent interface that is formed between the matrix and the polymer, so that the light is modulated. Thereby, the P wave is transmitted, but the S wave undergoes the modulation of light, such as scattering or reflection, so that polarization separation occurs.

Therefore, the matrix and the plate-like polymer can induce the light modulation effect only after they form the birefringent interface. When the matrix is optically isotropic, the plate-like polymer can be birefringent. In contrast, when the matrix is optically birefringent, the polymer can be optically isotropic. Specifically, when the refractive indexes of polymer are nX1 in the x-axial direction, nY1 in the y-axial direction, and nZ1 in the z-axial direction, and the refractive indexes of the matrix are nX2, nY2 and nZ2 in the x-, y- and z-axial directions, in-plane birefringence may occur between nX1 and nY1. More preferably, at least one of the refractive indexes of the matrix and the polymer in the x-, y- and z-axial directions may be different from each other. More preferably, when the axis of stretching is the x-axis, the difference between the refractive indexes in the y- and z-axial directions may be 0.05 or less, and the difference between the refractive indexes in the x-axial direction may be 0.1 or more. Typically, when the difference between the refractive indexes is 0.05 or less, it is interpreted as matching.

According to an exemplary embodiment of the invention, the number of total layers of the plate-like polymer may range from 50 to 3000. The number of plate-like polymer components that form one layer, may range from 30 to 1,000, and the interlayer gap between adjacent layers may range from 0.001 μm to 1.0 μm. In addition, the maximum distance between adjacent plate-like polymer components that form one layer, may range 0.001 μm to 1.0 μm. In addition, the length of the short axis in the vertical cross-section in the lengthwise direction of the plate-like polymer may range from 0.01 μm to 1.0 μm, and the length of the long axis in the vertical cross-section in the lengthwise direction of the stretched body may range from 100 μm to 17,000 μm. Meanwhile, the interlayer gap, the number of layers, the distance, the length of the long axis, the length, and the like of the short axis of the invention, which have been described above, may be properly adjusted depending on the aspect ratio and the intended wavelength of light of the invention.

In the invention, the thickness of the core layer may range from 20 µm to 180 µm, and the thickness of the skin layer may range from 50 µm to 300 µm. However, this is not intended to be limiting.

Figure 8:
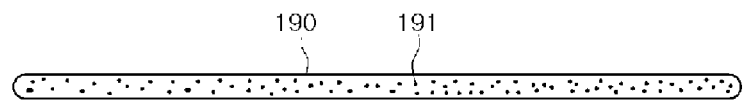
FIG. 8 is a cross-sectional view showing a plate-like polymer element according to another exemplary embodiment of the invention.

According to an exemplary embodiment of the invention, the aspect ratio may be coated with a third material, or may contain another material inside the polymer. Specifically, FIG. 8 is a cross-sectional view showing a plate-like polymer component according to an exemplary embodiment of the invention. A third material 191, such as filler, metal particles, polymer, or the like, may also be contained inside the polymer 190. In this case, the contained third material 191 may have a different refractive index, such that it forms a birefringent interface with the polymer. For example, when the polymer 190 has a birefringent optical property, the third material 191 may be optically isotropic in order to form a birefringent interface with the polymer 190. Meanwhile, the third material 191 may also be a stretched body, which is stretched in the lengthwise direction of the polymer. Furthermore, when the polymer is coated with the third material, as in the case in which the third material is contained inside the polymer, the refractive index of the third material may be properly adjusted such that a birefringent interface can be formed between the matrix and the third material and/or between the polymer and the third material.

A description will be given below of a method of manufacturing a polymer-dispersed reflective polarizer according to an embodiment of the invention.

First, in step (1), a plurality of first components, a second component, and a skin layer component are supplied to respective extruders. The plurality of first components is intended to be dispersed in the second component, which forms the substrate, and may be any type of polymer that is typically used in a polymer-dispersed reflective polarizer. It is preferred that the plurality of first components be selected from among, but not limited to, polyethylene naphthalate (PEN), co-polyethylene naphthalate (co-PEN), polyethylene terephthalate (PET), polycarbonate (PC), polycarbonate (PC) alloy, polystyrene (PS), heat-resistant polystyrene (PS), polymethylmethacrylate (PMMA), polybutylene terephthalate (PBT), polypropylene (PP), polyethylene (PE), acrylonitrile butadiene styrene (ABS), polyurethane (PU), polyimide (PI), polyvinylchloride (PVC), styrene acrylonitrile (SAN) mixture, ethylene vinyl acetate (EVA), polyamide (PA), polyacetal (polyoxymethylene: POM), phenol, epoxy (EP), urea (UF), melanin (MF), unsaturated polyester (UP), silicon (Si) and cyclo olefin polymer (COP). It is further preferred that the plurality of first components be PEN.

The second component is intended to form the matrix, and may be any material, as long as it can be typically used as a matrix in a dispersed-polymer reflective polarizer. It is preferred that the second component be one or a mixture selected from among, but not limited to, polyethylene naphthalate (PEN), co-polyethylene naphthalate (co-PEN), polyethylene terephthalate (PET), polycarbonate (PC), polycarbonate (PC) alloy, polystyrene (PS), heat-resistant polystyrene (PS), polymethylmethacrylate (PMMA), polybutylene terephthalate (PBT), polypropylene (PP), polyethylene (PE), acrylonitrile butadiene styrene (ABS), polyurethane (PU), polyimide (PI), polyvinylchloride (PVC), styrene acrylonitrile (SAN) mixture, ethylene vinyl acetate (EVA), polyamide (PA), polyacetal (polyoxymethylene: POM), phenol, epoxy (EP), urea (UF), melanin (MF), unsaturated polyester (UP), silicon (Si) and cyclo olefin polymer (COP). It is further preferred that the second component be co-PEN, in which a monomer, such as dimethyl-2,6-naphthalene dicarboxylate, ethylene glycol, or cyclohexanedimethanol (CHDM), is suitably polymerized.

The skin layer component may be any material that is used as a matrix in a dispersed-polymer reflective polarizer. It is preferred that the skin layer component be at least one selected from among, but not limited to, polyethylene naphthalate (PEN), polycarbonate (PC), polycarbonate (PC) alloy, polystyrene (PS), heat-resistant polystyrene (PS), polymethylmethacrylate (PMMA), polybutylene terephthalate (PBT), polypropylene (PP), polyethylene (PE), acrylonitrile butadiene styrene (ABS), polyurethane (PU), polyimide (PI), polyvinylchloride (PVC), styrene acrylonitrile (SAN) mixture, ethylene vinyl acetate (EVA), polyamide (PA), polyacetal (polyoxymethylene: POM), phenol, epoxy (EP), urea (UF), melanin (MF), unsaturated polyester (UP), silicon (Si) and cyclo olefin polymer (COP). It is preferred that the polycarbonate alloy be implemented as polycarbonate and denature glycol poly cyclohexylene dimethylene terephthalate (PCTG). It is further preferred that the polycarbonate alloy contain polycarbonate and denature glycol poly cyclohexylene dimethylene terephthalate (PCTG) at a weight ratios ranging from 5:95 to 95:5. According to embodiments of the invention, the skin layer may be made of a material that exhibits a small change in refractive index during being stretched or drawn, and more preferably, polycarbonate (PC) or a PC alloy.

The plurality of first components, the second component, and skin layer component may be supplied to respective independent extruding sections. In this case, the extruding sections may be at least three extruding sections. In addition, supplying the components to one extruding section, which has separate supply passages and dispensing ports such that the polymer components are not mixed, is interpreted as supplying to a plurality of extruding sections, which thus falls within the scope of the invention. The extruding section may be an extruder, and may also include a heating means in order to convert solid polymer components, which are supplied thereto, into liquid.

The foregoing step (1) explains the method of manufacturing the reflective polarizer including the skin layer. The skin layer component and the extruding section to which the skin layer component is input may be omitted when manufacturing a reflective polarizer that does not have a skin layer.

Afterwards, in step (2), a sea-island type complex flow is formed by inputting the plurality of first components and the second component, transported from the respective extruding sections, into a sea-island type extrusion mouthpiece (extrusion dispenser). In the sea-island type complex flow, the plurality of first components is dispersed in the second component, and the sea-island type complex flow reflects a transverse wave (S wave) having an intended wavelength.

Figure 9:
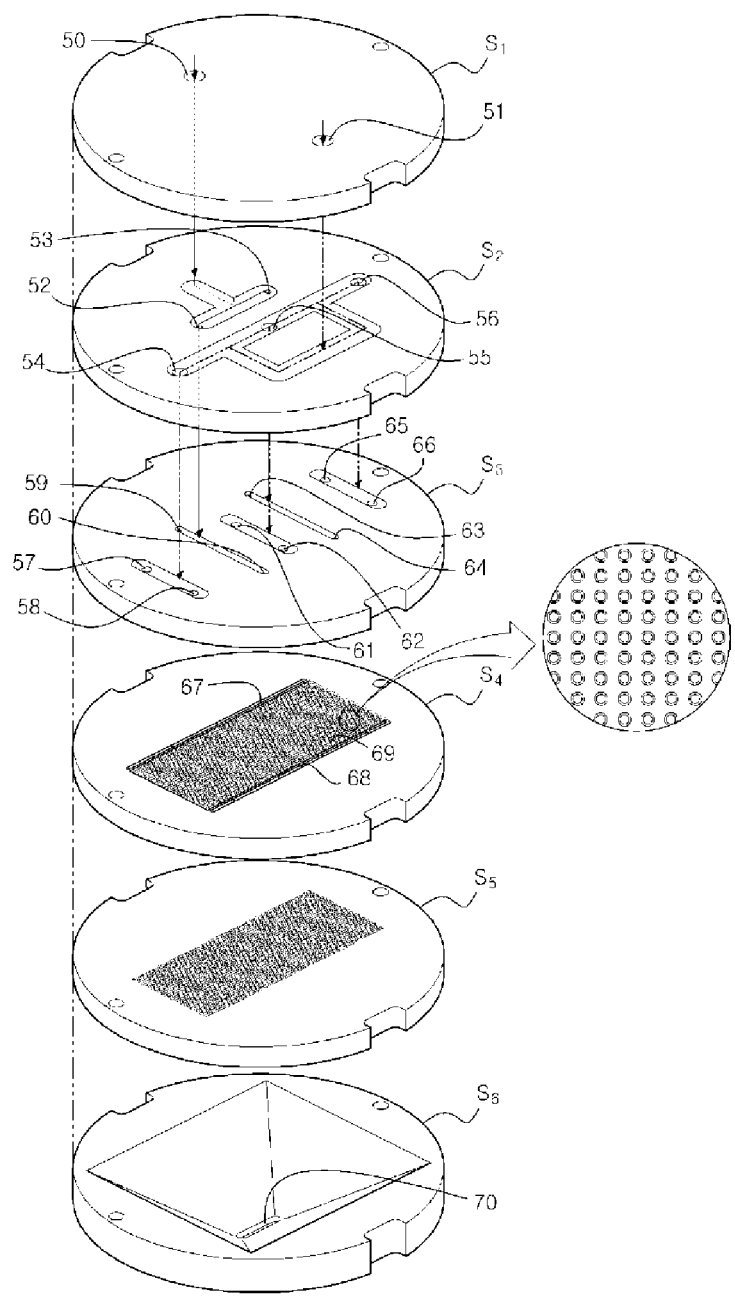
FIG. 9 and FIG. 10 are perspective views showing an assembly structure of distribution plate of a sea-island type extrusion mouthpiece (extrusion dispenser, 押出口金), which can be used in the invention.
Figure 10:
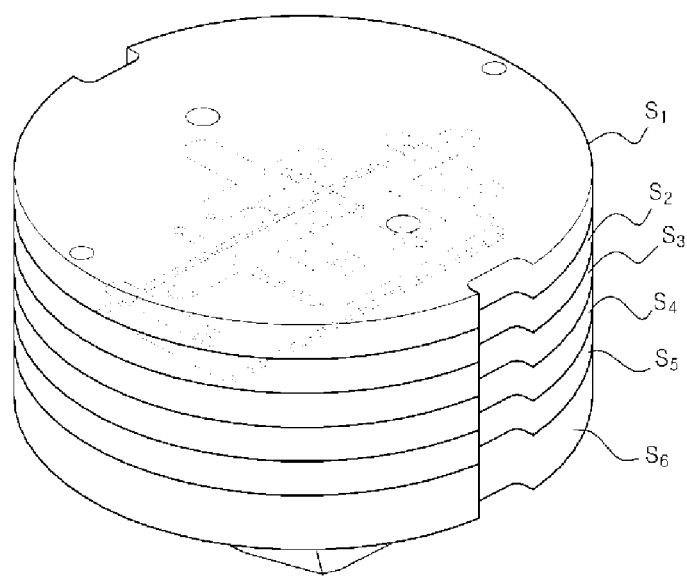

Specifically, FIG. 9 and FIG. 10 are perspective views showing an assembly structure of a distribution plates of a sea-island type extrusion mouthpiece, which can be used in the invention. A first distribution plate S1 of the mouthpiece, which is positioned on the upper end of the sea-island type extrusion mouthpiece, may have therein a first component supply passage 50 and a second component supply passage 51. In the first and second components, which are transported through the extruding sections, the plurality of first components can be input into the first component supply passage 50, and the second component can be supplied to the second supply passage 51. The supply passage may be implemented as a plurality of supply passages. After having passed through the first distribution plate S1, the polymer components are transported to a second distribution plate S2, which is below the first distribution plate S1. The plurality of first components, which is input through the first component supply passage 50, is diverged into a plurality of supply passages 52 and 53 and is transported therethrough. In addition, the second component, which is input through the second component supply passage 51, is diverged along channels into a plurality of supply passages 54, 55 and 56, and is transported therethrough. After having passed through the second distribution plate S2, the polymer components are transported to a third distribution plate S3 of the mouthpiece, which is below the second distribution plate S2. The plurality of first components, which is input through the first component supply passages 52 and 53, is diverged along channels into first component supply passages 59, 60, 63 and 64, which are formed in the third distribution plate S3, and is transported therethrough. Likewise, the second component, which is input through the second component supply passages 54, 55 and 56, is diverged along channels to second component supply passages 57, 58, 61, 62, 65 and 66, which are formed in the third distribution plate S3, and is transported therethrough. After having passed through the third distribution plate S3, the polymer components are transported to a fourth distribution plate S4 of the mouthpiece, which is below the third distribution plate S3. The plurality of first components, which is input through the first component supply passages 59, 60, 63 and 64, is widely spread before being input into the first supply passages 69 formed in the fourth distribution plate S4. The second component, which is input through the second component supply passages 57, 58, 61, 62, 65 and 66, is input along channels to second component supply passages 67 and 68, which are formed in the upper and lower ends of the first supply passages 69. Here, the number of layers of the plurality of first components included in the sea-island type complex flow is determined depending on the number of layers "n" of the first component supply passages 69 in the vertical direction. For example, when the number of layers in the vertical direction is 50, the number of layers of the plurality of first components included in the first sea-island type complex flow is 50. In the fourth distribution plate S4, the number of layers of the island component may be 25 or more, preferably 50 or more, more preferably 100 or more, still more preferably 200 or more, even more preferably 400 or more, and most preferably 600 or more. Afterwards, in a fifth distribution plate S5 of the mouthpiece, the plurality of first components permeates between the dispersed first components, thereby forming the sea-island type complex flow in which the plurality of first components is dispersed in the second component. In sequence, the sea-island type complex flow is discharged through a discharge port 70 in the sixth distribution plate S6 of the mouthpiece. Meanwhile, FIG. 9 and FIG. 10 show an example of sea-island type distribution plates of the mouthpiece that can be used in the invention. It will be apparent to a person having ordinary skill in the art that the number and structure of the distribution plates of the mouthpiece, the size and shape of the mouthpiece holes, and the like can be suitably designed in order to manufacture the sea-island type complex flow in which the plurality of first components is dispersed in the second component. It is preferred that the diameter of the mouthpiece hole of the island component supply passage range from 0.17 nm to 5 nm. However, the invention is not limited thereto.

Figure 11:
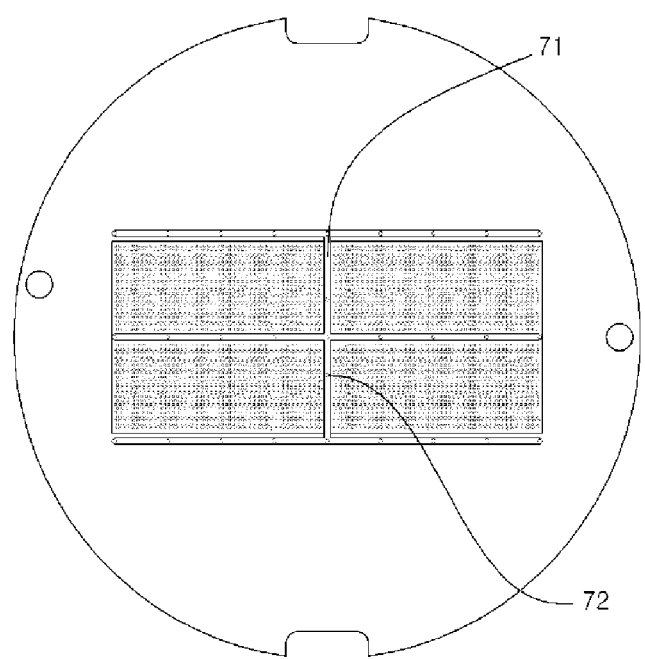
FIG. 11 is a cross-sectional view showing a distribution plate of a mouthpiece according to another exemplary embodiment of the invention.

In the meantime, in the fourth distribution plate S4, an island junction phenomenon may occur between the island components (first components) as the number of layers of the island component supply passages increases. In order to prevent this, as shown in FIG. 11, the island component supply passages are partitioned, and sea component supply passages 71 and 72 are formed in the partitioned supply passages, such that the sea component can more efficiently permeate between the island components. This can minimize the island junction phenomenon between the island components (first components), included in the final matrix, even though the number of layers of the island component supply passages increases.

Figure 12:
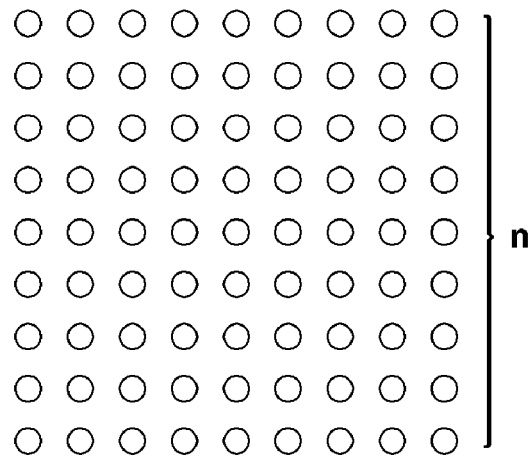
FIGS. 12 and 13 are cross-sectional views showing in detail an array of island-component supply passages (#mouthpiece holes) in a distribution plate of a mouthpiece according to an exemplary embodiment of the invention.
Figure 13:
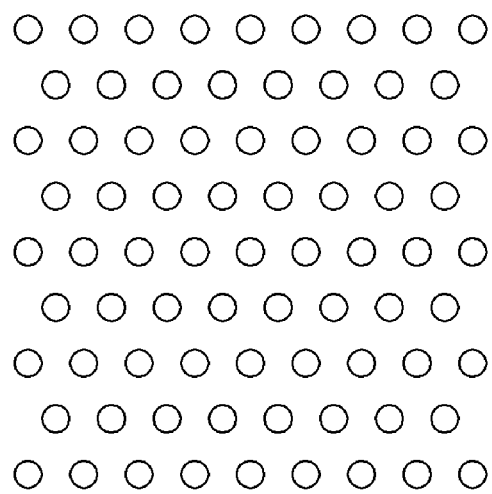

In FIG. 9, the island component supply passages of the fourth distribution plate of the mouthpiece can be linearly arranged, as shown in FIG. 12. However, in order to minimize the junction between the islands and disperse more island component in the matrix, the island component supply passages may be arranged in a zigzag type, as shown in FIG. 13. The number of separated layers of the plurality of first components of the reflective polarizer, which is subsequently manufactured, is determined based on the number "n" of layers of the island component supply passage shown in FIG. 12.

Figure 14:
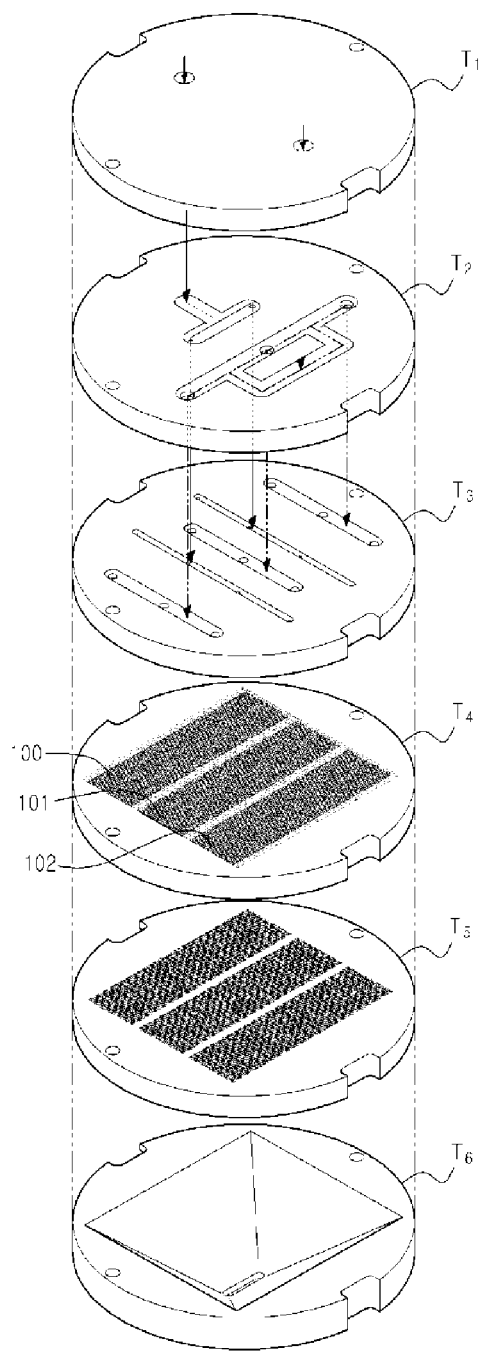
FIGS. 14 and 15 are perspective views showing an assembly structure of distribution plate of a sea-island type extrusion mouthpiece, which can be used in the invention.
Figure 15:
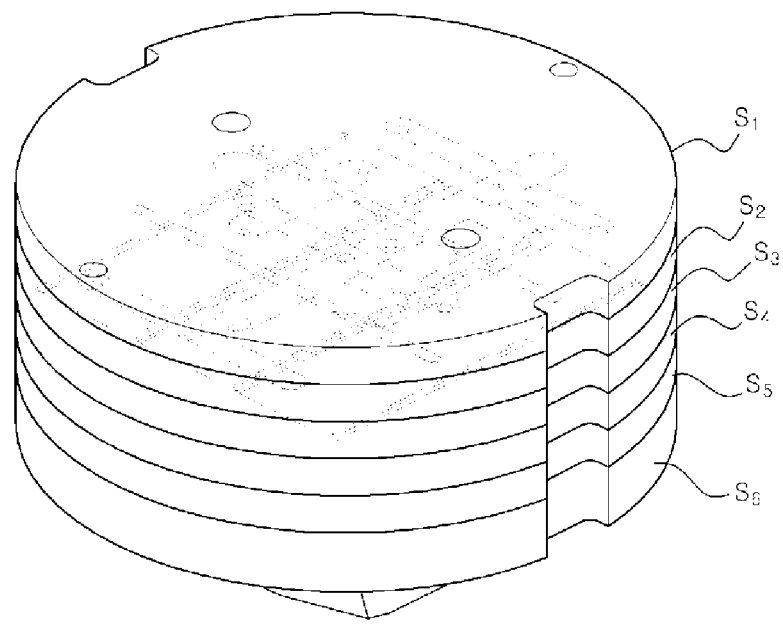

FIGS. 14 and 15 are perspective views showing an assembly structure of distribution plates of the sea-island type extrusion mouthpiece according to an exemplary embodiment of the invention. Specifically, the sea-island type extrusion mouthpiece has 6 distribution plates (T1 to T6), in which the fourth and fifth distribution plates T4 and T5 differ from the distribution plates of the mouthpiece shown in FIG. 9. Describing the difference from FIG. 9, in the fourth distribution plate T4 of the mouthpiece shown in FIG. 14, the areas between groups of first component supply passages 100, 101 and 102 are partitioned into channels that include the second component supply passages, as in FIG. 11. This configuration allows the second component to uniformly permeate into the plurality of first components.

It is also possible to form a sea-island type complex flow through the fourth distribution plate T4 of the mouthpiece and the fifth distribution plate T5 of the mouthpiece shown in FIG. 14. That is, it is possible to prepare separate sea-island type complex flows through the groups of partitioned island component supply passages 100, 101, and 102 of the fourth distribution plate T4 of the mouthpiece, form three sea-island type complex flows from those flows in the mouthpiece, and then joining the three flows into one. A separate change in the design of the distribution plate of the mouthpiece or the like for this purpose will be apparent to a person having ordinary skill in the art, and falls within the scope of a plurality of integrated sea-island type extrusion mouthpieces.

In the sea-island type complex flow, the optical thickness of the plurality of first components dispersed in the second component may vary in order to cover different wavelength ranges of light. For this, the diameter, cross-section, shape, and/or number of layers of the island component supply passages and/or the sea component supply passages, which are included in the same sea-island type extrusion mouthpiece, may differ. The reflective polarizer that is ultimately manufactured through the spreading and stretching, is very advantageous in covering the entire range of visible light, since the plate-like polymer components formed therein can have a variety of optical thicknesses.

More specifically, the optical thickness indicates n×d (where n is the refractive index, and d is the physical thickness). Therefore, it is possible to vary the optical thickness of the first components contained in the sea-island type complex flow by adjusting the mouthpiece holes of the sea-island type extrusion mouthpiece such that they may differ in the cross-sectional area, diameter, or the like. When manufactured in this way, the reflective polarizer can reflect S wave and allow P wave to pass through in a wide wavelength range of light.

More specifically, the wavelength and optical thickness of light are defined by the following Relation 1:

$$\lambda = 4nd \quad \text{Relation 1,}$$

where λ is the wavelength (nm) of light, n is a refractive index, and d is a physical thickness (nm).

When the optical thickness nd varies, it is possible to cover not only a target wavelength range of light, but also a wavelength range of light that includes the target wavelength range. Therefore, it can help achieve uniform overall optical properties. The foregoing variation in the optical thickness can be realized by imparting variation to the diameter, cross-sectional area, or the like of the island component supply passage in one sea-island type extrusion mouthpiece.

Figure 16:
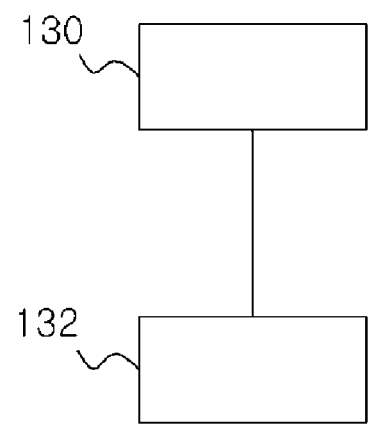
FIG. 16 is a conceptual view showing a first pressing means for forming a sea-island type complex flow according to an exemplary embodiment of the invention.
Figure 17:
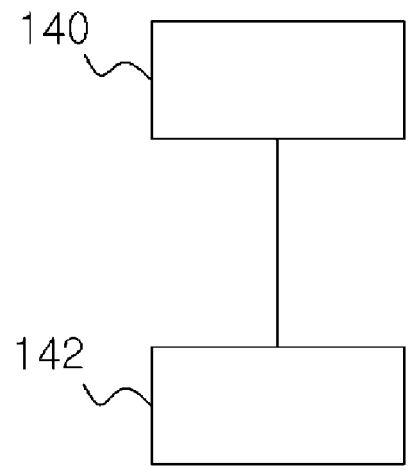
FIG. 17 is a conceptual view showing a second pressing means for forming a sea-island type complex flow according to an exemplary embodiment of the invention.

According to another exemplary embodiment of the invention, the step of discharging the plurality of first components transported from the extruding section to different sea-island type extrusion mouthpieces through the first pressing means may be also provided between the step (1) and the step (2). Specifically, FIG. 16 is a conceptual view showing the first pressing means. Here, the plurality of first components transported by the extruding section (not shown) can be supplied to the first pressing means 130, and then to the sea-island type extrusion mouthpiece 132 through the first pressing means 130. For this, the amount of discharge from the first pressing means 130 may range from 1 kg/hr to 100 kg/hr. However, this is not intended to be limiting.

Likewise, the step of discharging the second component, which is transported from the extruding section, to different sea-island type extrusion mouthpieces through the second pressing means may also be included. Specifically, FIG. 12 is a conceptual view showing the second pressing means. Here, the second component transported from the extruding section (not shown) can be supplied to the second pressing means 140, and can be supplied to the sea-island type extrusion mouthpiece 142 via the second pressing means 140. For this, the amount of discharge from the second pressing means 130 may range from 1 kg/hr to 100 kg/hr. However, this is not intended to be limiting.

Afterwards, in the step (3), the skin layer component transported from the extruding section is joined to at least one surface of the core layer (sea-island type complex flow). Preferably, the skin layer component can be added to both surfaces of the core layer. When it is added to both surfaces, the material and thickness of the skin layer may be the same or different. The core layer and the skin layer can be joined in separate places, or the joining can be simultaneously carried out in place of the step (2). The step (3) may be omitted in the case in which a reflective polarizer that does not have the foregoing skin layer is manufactured.

Figure 18:
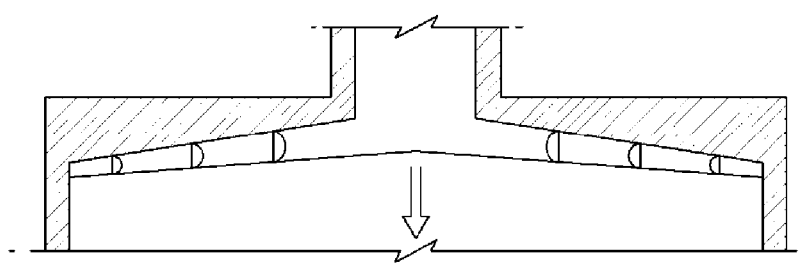
FIG. 18 is a cross-sectional view showing a coat-hanger die according to an exemplary embodiment of the invention.
Figure 19:
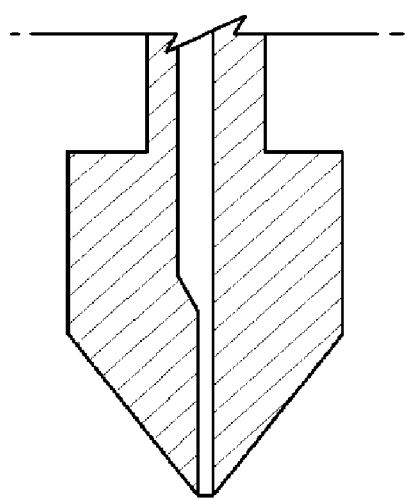
FIG. 19 is a side elevation view of FIG. 13.

Afterwards, in the step (4), the flow control section induces the sea-island type complex flow to spread so that the plurality of first components of the sea-island type complex flow forms a plate-like shape. Specifically, FIG. 18 is a cross-sectional view showing a coat-hanger die according to an exemplary embodiment of the invention, and FIG. 19 is a side elevation view of FIG. 18. Here, the degree of spreading the core layer can be suitably adjusted so that the shape of the cross-section, which is perpendicular to the lengthwise direction of the plurality of first components, has a plate-like shape. In FIG. 18, in the coat-hanger die, the core layer to which the skin layer transported through the channels is joined is widely spread in the lateral direction. Then, the plurality of first components contained therein is also widely spread in the lateral direction. In addition, as shown in the side view of FIG. 19, the coat-hanger die is configured such that it is widely spread in the lateral direction but decreases in the vertical direction, such that it induces spreading in the horizontal direction of the core layer to which the skin layer is joined but shrinking in the thickness direction. This is because Pascal's principle applies thereto. In a closed system, due to the principle in which pressure is transmitted to all portions including a precise portion, fluid is induced to spread widely in lateral directions. Therefore, the size of the outlet increases in the lateral direction but decreases in the thickness direction compared to the size of the inlet. Here, a molten liquid substance follows Pascal's law, in which the flow and shape of liquid substance can be controlled using pressure. It is required for the polymer to have a flow rate and a viscosity that induce the polymer to form a Laminar flow having a Reynolds number of preferably 2,500 or less. At a turbulent flow of 2,500 or more, the plate-like shape is not uniformly induced, thereby increasing the possibility that optical characteristics may vary. The width of the outlet of the coat-hanger die in the bilateral direction may range from 800 mm to 2,500 mm, and the pressure is required to be adjusted so that the flow of the polymer does not exceed Reynolds number 2,500. This is because the flow of the polymer becomes turbulent at higher values and thus the arrangement of the core may scatter. In addition, the inside temperature may range from 265° C. to 310° C. Here, the degree of spreading may be influenced by the compatibility of the plurality of first components and the second component. The plurality of first components may be PEN and the second component may be co-PEN in order to achieve excellent spreading ability. In addition, the degree of spreading can by adjusted by suitably polymerizing monomers that form the co-PEN, for example, dimethyl-2,6-naphthalene dicarboxylate, dimethyl terephthalate, ethylene glycol and cyclohexanedimethanol (CHDM). The flow control section may be implemented as a coat-hanger die having the form of a T-die or a manifold, such that the plurality of first components can form the plate-like shape. However, this is not intended to be limiting. Any structure that can induce the plurality of first components to form the plate-like shape can be used without limitations.

In the plate-like shape, the aspect ratio, which is the ratio of the length of the long axis to the length of the short axis, may be 1/200 or less, 1/300 or less, 1/500 or less, 1/1000 or less, 1/2000 or less, 1/5000 or less, 1/10000 or less, or 1/20000 or less. At aspect ratios exceeding 1/200, it is difficult to realize the intended optical properties even when the aspect ratio is subsequently decreased by stretching the polarizer. In particular, when the spreading is induced at aspect ratios exceeding 1/200 and the final aspect ratio of the plurality of first components is then adjusted using a high stretch ratio, the area of the plurality of first components is smaller compared to that of the second component, so that gaps in the plurality of first components cause light to leak, thereby degrading the optical characteristics thereof.

As a result, as the ratio of the length of the long axis to the length of the short axis decreases, it becomes more probable that intended optical properties can be obtained even when a smaller amount of plate-like polymer is contained inside the matrix.

According to an exemplary embodiment of the invention, after the step (4), the step of stretching the reflective polarizer may further be included. More specifically, the method also includes the steps of: (5) cooling and planarizing the polarizer transported from the flow control section; (6) stretching the planarized polarizer; and (7) thermally fixing the stretched polarizer.

First, the step (5) of cooling and planarizing the polarizer transported from the flow control section may be carried out using the step of planarizing the polarizer by cooling and solidifying it, followed by cast rolling. This step is used in a typical process of manufacturing the reflective polarizer.

Afterwards, the step of stretching the planarized polarizer is carried out. The stretching step may be carried out using the typical process of stretching a reflective polarizer. This can cause a difference in the refractive index between the plurality of first components and the second component, thereby creating light modulation at the interface therebetween. The aspect ratio of the plurality of first components that is induced to spread is further decreased. Therefore, in order to adjust the optical thickness by inducing the aspect ratio of the plate-like shape of the plurality of first components that is desired for the final reflective polarizer, the sea-island type extrusion mouthpiece can be suitably set in consideration of the diameter of the island component supply passage, the condition for inducing spreading, and the stretch ratio. For this, the stretching process may carry out the uniaxial stretching or biaxial stretching. More preferably, the uniaxial stretching may be performed. In the case of the uniaxial stretching, the direction of stretching may be the lengthwise direction of the plurality of first components. The stretch ratio may be three to twelve times. In addition, the method of converting an isotropic material into a birefringent material is known in the art. For example, when stretching the material at a suitable temperature, polymer molecules may become oriented, and thus the material becomes birefringent.

Afterwards, the step (7) of thermally fixing the stretched polarizer is carried out, thereby producing the final reflective polarizer. The thermal fixing step may be carried out using a typical method. Preferably, it may be carried out at a temperature ranging from 180° C. to 200° C. for 0.1 to 3 minutes, using an infrared (IR) heater, a ceramic heater, a hot air heater, or the like. When the optical thickness, aspect ratio or the like that is intended in the present invention is determined, it is possible to suitably control the standard of the sea-island type extrusion mouthpiece, the amount of discharge by the pressing means, the standard of the flow control section, the stretch ratio, or the like by considering the determined value in order to manufacture the reflective polarizer of the invention.

According to an exemplary embodiment of the invention, provided is an apparatus for manufacturing a polymer-dispersed reflective polarizer, which includes a core layer, in which a plurality of first components is dispersed in a second component, and a skin layer formed on at least one surface of the core layer. The apparatus includes at least two extruding sections, a spin block section, and a flow control section. The plurality of first components is input into one of the extruding sections, and the second component is input into the other one of the extruding sections. The spin block section includes a sea-island type extrusion mouthpiece. The plurality of first components, which is transported from the extruding section to which the plurality of first components was input, and the second component, which is transported from the extruding section to which the second component was input, are input into the sea-island type extrusion mouthpiece in order to form a sea-island type complex flow, in which the plurality of first components is dispersed in the second component, such that the sea-island type complex flow reflects a transverse wave (S wave) having an intended wavelength. The flow control section induces the sea-island type complex flow to spread so that the plurality of first components of the sea-island type complex flow forms a plate-like shape with respect to a vertical cross-section.

Figure 20:
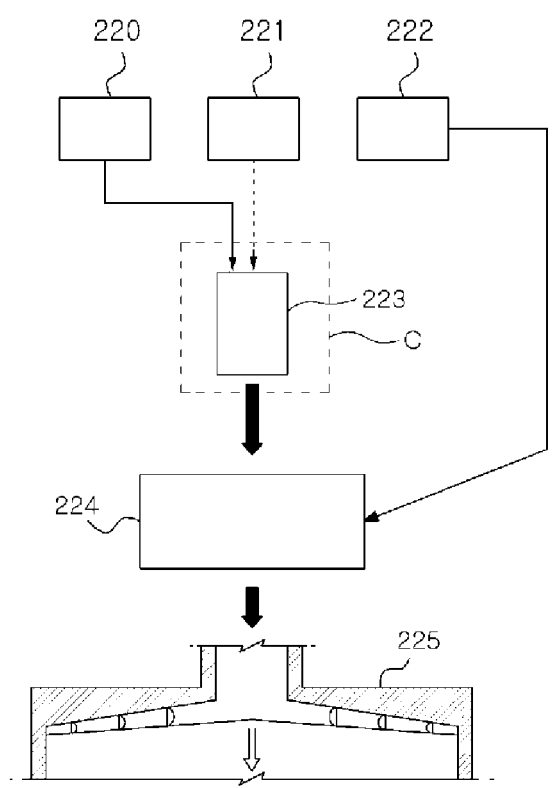
FIG. 20 is a schematic view showing an apparatus for manufacturing a polymer-dispersed reflective polarizer according to an exemplary embodiment of the invention.

FIG. 20 is a schematic view showing an apparatus for manufacturing a polymer-dispersed reflective polarizer according to an exemplary embodiment of the invention. Specifically, the apparatus includes a first extruding section 220 into which the plurality of first components is input, a second extruding section 221 into which the second component is input, and a third extruding section 222 into which a skin layer component is input. The first extruding section 220 communicates with the spin block section C, which includes the sea-island type extrusion mouthpiece 223, and supplies the plurality of first components in the molten state to the sea-island type extrusion mouthpiece 223. The second extruding section 221 also communicates with the spin block section C, and supplies the second component in the molten state to the sea-island type extrusion mouthpiece 223 of the spin block section C. The sea-island type complex flow, in which the plurality of first components is dispersed in the second component, is produced through the sea-island type extrusion mouthpiece 223. The sea-island type extrusion mouthpiece 223 may be the sea-island type extrusion mouthpiece shown in FIG. 9 or FIG. 14. The diameter or cross-sectional area of the island component supply passage and/or the sea component supply passage, which is included in the sea-island type extrusion mouthpiece, may differ. The sea-island type complex flow, which is manufactured using the sea-island type extrusion mouthpiece 223, forms the core layer. Afterwards, the core layer is transported to the feed block section 224, and is then joined with the skin layer component transported from the third extruding section 222. Therefore, the third extruding section 222 and the feed block section 224 may communicate with each other. In addition, although FIG. 20 illustrates the core layer and the skin layer joined in the feed block section 224, they may be joined in the spin block section C, and the feed block section 224 may be omitted. Afterwards, the core layer to which the skin layer is joined is transported to the flow control section 225, and the spreading of the plurality of first components is induced, thereby forming the plate-like shape. Preferably, the flow control section may be a T-die or a coat-hanger die.

Figure 21:
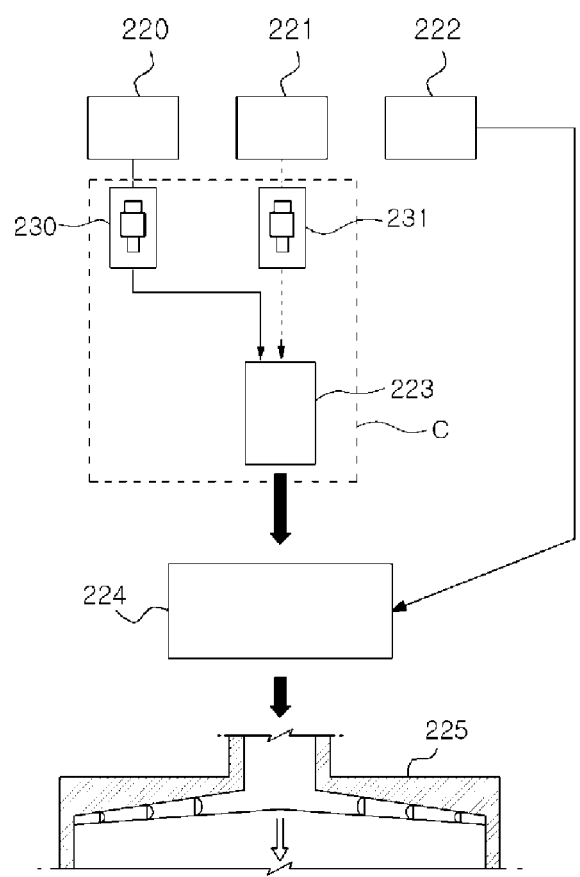
FIG. 21 is a schematic view showing an apparatus for manufacturing a polymer-dispersed reflective polarizer according another exemplary embodiment of the invention.

FIG. 21 is a schematic view showing an apparatus for manufacturing a polymer-dispersed reflective polarizer according to another exemplary embodiment of the invention. Describing the difference from FIG. 20, the first extruding section 220 transports the plurality of first components to a first pressing means 230. The first pressing means 230 discharges the plurality of first components to the sea-island type extrusion mouthpiece 224. The second extruding section 221 transports the second component to a second pressing means 231. The second pressing means 231 discharges the second component to the sea-island type extrusion mouthpiece 223. Meanwhile, it is also possible that a plurality of first pressing means and a plurality of second pressing means are present. Through the sea-island type extrusion mouthpiece 223, the sea-island type complex flow, in which the plurality of first components is dispersed in the second component, is produced. The first pressing means 230, the second pressing means 231, and the sea-island type extrusion mouthpiece 223 form the spin block section C.

Meanwhile, the foregoing FIG. 20 and FIG. 21 are views showing the apparatus for manufacturing the reflective polarizer that includes the skin layer. In the case of manufacturing a reflective polarizer that does not include a skin layer, the third extruding section, into which the skin layer component is input, and the feed block section, in which the core layer and the skin layer are joined, may be omitted.

Figure 22:
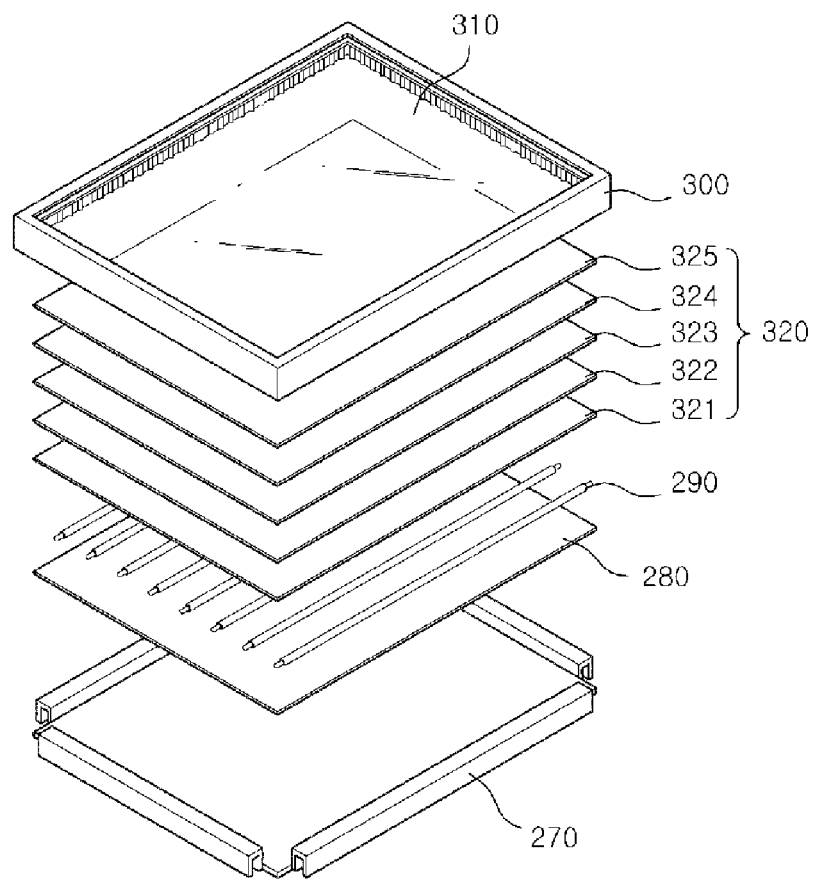
FIG. 22 is an exploded perspective view showing an LCD including a reflective polarizer according to an exemplary embodiment of the invention.

According to an exemplary embodiment of the invention, provided is a liquid crystal display (LCD) that includes the reflective polarizer of the invention. FIG. 22 is an exploded perspective view showing an LCD including a reflective polarizer according to an exemplary embodiment of the invention. A reflector plate 280 is disposed on a frame 270, and a cold cathode fluorescent lamp (CCFL) 290 is positioned on the upper surface of the reflector plate 280. An optical film 320 is positioned on the upper surface of the CCFL 290, and includes a diffuser plate 321, a light dispersion film 322, a prism film 323, a reflective polarizer 324 and an absorbing polarizer film 325, which are stacked in this sequence. This stacking sequence may vary depending on the purpose, some components may be omitted, or some components may be provided in plurality. For example, the diffuser plate 321, the light diffuser film 322, or the prism film 323 may be omitted from the components of the apparatus, or their sequence or positions may change. Furthermore, an LCD panel 310 may be positioned on the upper surface of a phase difference film 320 in the state in which it is fitted into a mold frame 300.

Referring to the path of light, light emitted from the CCFL 290 reaches the diffuser plate 321 of the optical film 320. The light that is delivered through the diffuser plate 321 passes through the light diffuser film 322 so that the light propagates in the direction perpendicular to the optical film 320. The light that has passed through the light diffuser film 322 passes through the prism film 323 and then reaches the reflective polarizer 324, so that light modulation occurs. Specifically, P waves pass through the reflective polarizer 324 without being lost, whereas S waves undergo light modulation (e.g., reflection, scattering, or refraction). That is, they are reflected by the reflector plate 280, which is the rear side of the CCFL 290, and then pass through the reflective polarizer 324 after their properties are randomly changed into those of P or S waves. After that, they pass through the absorbing polarizer film 325, and then reach the LCD panel 310. Due to the foregoing principle, when the reflective polarizer of the invention is inserted into the LCD for use, a remarkable improvement in luminance over a typical reflective polarizer can be expected. Meanwhile, the CCFL 290 can be replaced with LEDs.

In the foregoing description of the invention, the usage of the reflective polarizer has been described in relation to LCDs. However, this is not intended to be limiting. The reflective polarizer of the invention can be widely used in flat display technologies, such as projection displays, plasma displays, field emission displays, electroluminescent displays, and the like.

EXAMPLES

Hereinafter, the invention is described in detail with reference to Examples and Experiment Example. It should be understood, however, that the following Examples and Experiment Example are provided for illustrative purposes only, and do not limit the scope of the invention.

Example 1

The processing shown in FIG. 21 was carried out. Specifically, first and second components were input into first and second extruding sections, respectively, and a skin layer component was input into a third extruding section. The plurality of first components was PEN, having a refractive index of 1.65. The second component was co-PEN, having a refractive index of 1.64, which was produced by reacting a material, in which dimethylene terephthalate and dimethyl-2,6-naphthalene dicarboxylate were mixed at a molar ratio of 6:4, with ethylene glycol (EG) at a molar ratio of 1:2. The third component was a polycarbonate alloy having a refractive index of 1.58, in which 90 wt % of polycarbonate and 10 wt % of poly cyclohexylene dimethylene terephthalate (PCTG) were polymerized. The first and second components were extruded at a temperature of 295° C., and the flow of polymer was corrected via I.V. adjustment by checking it using a Cap Rheometer. The plurality of first components was transported to a first pressing means (a gear pump available from Kawasaki), and the second component was also transported to a second pressing means (a gear pump available from Kawasaki). The amount of discharge from the first pressing means was 8.9 kg/h, and the amount of discharge from the second pressing means was 8.9 kg/h. A sea-island type complex flow was produced using a sea-island type extrusion mouthpiece, as shown in FIG. 9. Specifically, the number of layers of the island component of the fourth distribution plate T4 of the sea-island type extrusion mouthpiece was 400, the diameter of the mouthpiece hole in the island component supply passage was 0.17 mm, and the number of island component supply passages was 25000. The diameter of the discharge-hole in the sixth distribution plate of the mouthpiece was 15 mm×15 mm. In a feed block having a three-stage structure, the skin layer component was flown through channel from the third extruding section, thereby forming a skin layer on the upper and lower surfaces of the sea-island type complex flow (core layer polymer). Spreading was induced in a coat-hanger die, as shown in FIG. 18 and FIG. 19, in which the flow rate and pressure gradient of the core layer polymer having the skin layer thereon were corrected, so that the aspect ratio of the sea-island type complex flow became 1/30295. Specifically, the entrance of the die had a width of 200 mm and a thickness of 20 mm, the exit of the die had a width of 960 mm and a thickness of 2.4 mm, and the flow rate was 1 m/min. Afterwards, the process of planarization was carried out in cooling and casting rolls, and stretching was carried out in the MD direction so that the object was stretched 6 times. As a result, the plurality of first components did not exhibit a change in the length of the long axis in the lengthwise cross-section, but the length of the short axis was decreased. Afterwards, thermal fixing was carried out using an IR heater, at 180° C. for 2 minutes, thereby manufacturing a polymer-dispersed reflective polarizer, as shown in FIG. 4. In the reflective polarizer manufactured as described above, the refractive indexes of the plurality of first components were 1.88 (nx), 1.64 (ny), and 1.64 (nz), and the refractive index of the second component was 1.62. The aspect ratio of the polymer was about 1/180000, the number of layers was 400, the length of the short axis (in the thickness direction) was 84 nm, the length of the long axis was 15.5 mm, and the average optical thickness was 138 nm. The thickness of the core layer was 59 μm, and the thickness of the skin layer was 170.5 μm in the upper and lower surfaces.

Example 2

Processing was carried out in the same way as in Example 1. Specifically, first and second components were input into first and second extruding sections, respectively, and a skin layer component was input into a third extruding section. The plurality of first components was PEN having a refractive index of 1.65. The second component was co-PEN having a refractive index of 1.62, which was produced by reacting a material, in which dimethylene terephthalate and dimethyl-2,6-naphthalene dicarboxylate were mixed at a molar ratio of 88:12, with ethylene glycol (EG) at a molar ratio of 1:2. The skin layer component was a polycarbonate alloy having a refractive index of 1.58, in which 90 wt % of polycarbonate and 10 wt % of poly cyclohexylene dimethylene terephthalate (PCTG) were polymerized. The intermediate conditions were the same as in Example 1. Spreading was carried out using a coat-hanger die, so that the aspect ratio of the sea-island type complex flow became 1/19665. Afterwards, a polymer-dispersed reflective polarizer, as shown in FIG. 4, was manufactured through the same process as Example 1. In the reflective polarizer manufactured as above, the refractive indexes of the plurality of first components were 1.88 (nx), 1.64 (ny), and 1.64 (nz), and the refractive index of the second component was 1.62. The aspect ratio of the polymer was about 1/117990, the number of layers was 400, the length of the short axis (in the thickness direction) was 84 nm, the length of the long axis was 10.1 mm, and the average optical thickness was 138 nm.

Example 3

Processing was carried out in the same way as in Example 1. Specifically, first and second components were input into first and second extruding sections, respectively, and a skin layer component was input into a third extruding section. The plurality of first components was PEN having a refractive index of 1.65. The second component was a polycarbonate alloy having a refractive index of 1.59, in which 70 wt % of polycarbonate and 30 wt % of poly cyclohexylene dimethylene terephthalate (PCTG) were polymerized. The skin layer component was a polycarbonate alloy having a refractive index of 1.58, in which 90 wt % of polycarbonate and 10 wt % of poly cyclohexylene dimethylene terephthalate (PCTG) were polymerized. The intermediate conditions were the same as in Example 1. Spreading was carried out using a coat-hanger die, so that the aspect ratio of the sea-island type complex flow became 1/565. Afterwards, the polymer-dispersed reflective polarizer shown in FIG. 15 was manufactured through the same process as Example 1. In the reflective polarizer manufactured as above, the refractive indexes of the plurality of first components were 1.88 (nx), 1.64 (ny), and 1.64 (nz), and the refractive index of the second component was 1.59. The aspect ratio of the polymer was about 1/3390, the number of layers was 400, the length of the short axis (in the thickness direction) was 84 nm, the length of the long axis was 0.29 mm, and the average optical thickness was 138 nm.

Comparative Example 1

A reflective polarizer for a 32-inch LCD was manufactured, in which 25000 birefringent fibers made of PEN, a first component, were included inside a co-PEN matrix, a second component. The birefringent fibers had a diameter of 0.158 μm.

Comparative Example 2

Processing was carried out in the same way as in Example 3. Specifically, first and second components were input into first and second extruding sections, respectively, and a skin layer component was input into a third extruding section. The first component was PEN having a refractive index of 1.65. The second component was a polycarbonate alloy having a refractive index of 1.59, in which 70 wt % of polycarbonate and 30 wt % of poly cyclohexylene dimethylene terephthalate (PCTG) were polymerized. The skin layer component was a polycarbonate alloy having a refractive index of 1.58, in which 90 wt % of polycarbonate and 10 wt % of poly cyclohexylene dimethylene terephthalate (PCTG) were polymerized. In the state in which the intermediate conditions were the same as in Example 1, the amount of discharge from a first pressing means was 4.5 kg/h, and the amount of discharge from a second pressing means was 8.9 kg/h. In the state in which the intermediate conditions were the same as in Example 1, spreading was induced in a coat-hanger die so that the aspect ratio of the sea-island type complex flow became 1/142. Afterwards, the polymer-dispersed reflective polarizer shown in FIG. 4 was manufactured through the same process as in Example 3. In the reflective polarizer manufactured as described above, the refractive indexes of the first component were 1.88 (nx), 1.64 (ny), and 1.64 (nz), and the refractive index of the second component was 1.59. The aspect ratio of the polymer was about 1/852, the number of layers was 400, the length of the short axis (in the thickness direction) was 84 nm, the length of the long axis was 0.073 mm, and the average optical thickness was 138 nm.

Experiment Example

The following properties of the reflective polarizers, which were manufactured from the foregoing Examples 1 to 3 and Comparative Examples 1 and 2, were measured and the results are presented in Table 1 below.

1. Transmittance

The transmission axis transmittance and reflection axis transmittance were measured according to the ASTM D1003 method using COH300A analysis equipment, available from NIPPON DENSHOKU company, Japan.

2. Degree of Polarization

The degree of polarization was measured using RETS-100 analysis equipment, available from OTSKA company.

3. Relative Luminance

The luminance of the respective reflective polarizer manufactured as above was measured as follows. After a panel was assembled onto a 32" direct backlight unit having a diffuser plate and a reflective polarizer, luminance was measured at 9 points using a BM-7 meter, available from Topcon company. The averages thereof are presented.

The relative luminance indicates the relative value of the luminance of other Examples 2 and 3 and Comparative Examples 1 and 2, when the luminance of the reflective polarizer of Example 1 was set to 100 (reference).

TABLE 1

|  | Relative luminance (%) | Degree of polarization ($\lambda = 550$ nm) | TAT[1] | RAT[2] |
|---|---|---|---|---|
| Example 1 | 100 | 85% | 87% | 7% |
| Example 2 | 96 | 75% | 85% | 12% |
| Example 3 | 91 | 68% | 84% | 16% |
| Comp. Ex. 1 | 85 | 64% | 82% | 18% |
| Comp. Ex. 2 | 82 | 54% | 84% | 25% |

Note)
TAT[1]: Transmission axis transmittance
RAT[2]: Reflection axis transmittance As is apparent from Table 1, it can be appreciated that the optical properties of the reflective polarizers of Examples 1 to 3 of the invention were significantly improved from those of the reflective polarizers of Comparative Examples 1 and 2.

Industrial Applicability

The reflective polarizer according to embodiments of the invention has excellent light modulation performance, and is thus widely applicable to fields in which the modulation of light is required. Specifically, the reflective polarizer according to embodiments of the invention can be widely used in flat display technologies, including a mobile display, an LCD, which requires high luminance and uses LEDs, a projection display, a plasma display, a field emission display, an electroluminescent display, and the like.

What is claimed is:

1. A reflective polarizer comprising; a plurality of disperse phases being dispersed in a matrix in order to allow a first polarization, which is emitted from outside, to pass through while reflecting a second polarization, wherein a refractive index of the plurality of disperse phases is different in at least one axial direction from that of the matrix, a light modulation interface is formed between the plurality of disperse phases and the matrix, an aspect ratio, which is a ratio of a length of a long axis to a length of a short axis with respect to a vertical cross-section of a polarizer, does not exceed 1/1000.

2. The reflective polarizer of claim 1, wherein the matrix is stretched in at least one axial direction.

3. The reflective polarizer of claim 1, wherein a difference in refractive indexes between the matrix and the plurality of disperse phases is 0.05 or less in two axial directions and 0.1 or more in a third axial direction.

4. The reflective polarizer of claim 1, wherein a skin layer is integrally formed on at least one surface of the matrix.

5. The reflective polarizer of claim 4, wherein a bonding layer is not formed between the matrix and the skin layer.

6. The reflective polarizer of claim 1, wherein the plurality of disperse phases has 100 layers or more with respect to a vertical cross-section in a lengthwise direction of the plurality of disperse phases, the layers being separated from each other.

7. The reflective polarizer of claim 1, wherein the plurality of disperse phases has 400 layers or more with respect to a vertical cross-section in a lengthwise direction of the plurality of disperse phases, the layers being separated from each other.

8. The reflective polarizer of claim 1, wherein the aspect ratio is 1/5000 or less.

9. The reflective polarizer of claim 1, wherein the aspect ratio is 1/10000 or less.

10. The reflective polarizer of claim 1, wherein the aspect ratio is 1/30000 or less.

11. The reflective polarizer of claim 1, wherein the length of the short axis of the vertical cross-section of the plurality of disperse phases ranges from 0.01 μm to 1.0 μm.

12. The reflective polarizer of claim 1, wherein 50% or more of the plurality of disperse phases satisfies the aspect ratio.

13. The reflective polarizer of claim 1, wherein the plurality of disperse phases in the matrix has a width of 1580 mm and a height of 400 μm with respect to the vertical cross-section of the reflective polarizer is one million or less.

14. The reflective polarizer of claim 13, wherein the plurality of disperse phases is 500 thousand or less.

15. The reflective polarizer of claim 13, wherein the plurality of disperse phases is 300 thousand or less.

16. The reflective polarizer of claim 13, wherein a transmittance of a reflective polarizer in a direction of a transmission axis is 87% or more, and a transmittance of a reflective polarizer in a direction of a reflection axis is 10% or less.

17. The reflective polarizer of claim 6, wherein an average distance $d_1$ between adjacent disperse phases that form a same layer is smaller than an average distance $d_2$ between adjacent disperse phases that form different layers.

18. A backlight unit comprising the reflective polarizer as set forth in claim 1.

* * * * *